United States Patent [19]

Sherer et al.

[11] 4,331,278
[45] May 25, 1982

[54] PIPE WELDING APPARATUS

[76] Inventors: Charles R. Sherer; William R. Mercer, both of 5121 Steadmont, Houston, Tex. 77040

[21] Appl. No.: 87,778

[22] Filed: Oct. 24, 1979

Related U.S. Application Data

[63] Continuation of Ser. No. 895,119, Apr. 10, 1978, abandoned.

[51] Int. Cl.³ .............................................. B23K 37/02
[52] U.S. Cl. ......................................... 228/29; 228/32; 228/45; 219/124.31; 219/125.11
[58] Field of Search .......................... 228/29, 32, 9, 45; 219/60 R, 60 A, 125.11, 125.12, 124.31; 266/56; 269/237

[56] References Cited

U.S. PATENT DOCUMENTS

| | | | |
|---|---|---|---|
| 2,271,582 | 2/1942 | Dixon | 30/97 |
| 2,591,809 | 4/1952 | Hanson | 228/27 X |
| 2,654,014 | 9/1953 | Schaefer | 219/60 R |
| 2,795,689 | 6/1957 | McNutt | 219/125.11 |
| 2,894,111 | 7/1959 | McNutt | 219/60 A |
| 2,985,746 | 5/1961 | Harmes | 219/125.11 |
| 3,005,899 | 10/1961 | Jenson et al. | 219/125.11 |
| 3,009,049 | 11/1961 | Stanley | 219/60 R |
| 3,032,331 | 5/1962 | Doty et al. | 269/237 X |
| 3,084,244 | 4/1963 | Rieppel et al. | 219/60 A |
| 3,084,246 | 4/1963 | Rieppel et al. | 219/125.11 |
| 3,088,018 | 4/1963 | Ross et al. | 219/60 A |
| 3,126,471 | 3/1964 | Nelson | 219/60 A |
| 3,135,850 | 6/1964 | Scheller et al. | 219/60 A |
| 3,179,781 | 4/1965 | Ross et al. | 219/60 A |
| 3,193,656 | 7/1966 | Bell et al. | 219/60 A |
| 3,207,881 | 9/1965 | Pagan | 219/60 A |
| 3,268,707 | 10/1966 | Thomas | 219/125.12 |
| 3,341,686 | 9/1967 | Sidbeck | 219/60 R |
| 3,461,264 | 8/1969 | Nelson et al. | 219/60 R |
| 3,571,557 | 3/1971 | Valentine | 219/125.12 |
| 3,604,612 | 9/1971 | Miller et al. | 228/29 X |
| 3,632,959 | 1/1972 | Nelson et al. | 219/60 A X |
| 3,646,309 | 2/1972 | Smith et al. | 219/60 R |
| 3,702,913 | 11/1972 | Kazlunskas et al. | 219/60 A |
| 3,711,076 | 1/1973 | Goetz | 228/29 |
| 3,718,798 | 2/1973 | Randolph et al. | 219/60 A |
| 3,737,614 | 6/1973 | Paulange | 219/60 A |
| 3,748,426 | 7/1973 | Stanley | 219/60 A |
| 3,748,433 | 7/1973 | Gwin et al. | 219/60 A X |
| 3,753,525 | 8/1973 | Homes | 219/60 A X |
| 3,777,115 | 12/1973 | Kazlauskas et al. | 219/60 R X |
| 3,806,694 | 4/1974 | Nelson et al. | 219/60 R X |
| 3,838,244 | 9/1974 | Petrides et al. | 219/60 A X |
| 3,903,391 | 9/1975 | Nelson et al. | 219/60 A |
| 3,937,916 | 2/1976 | Sciaky | 219/60 R X |
| 3,974,356 | 8/1976 | Nelson et al. | 219/60 A |
| 4,005,305 | 1/1977 | Nelson et al. | 219/60 A X |
| 4,007,705 | 2/1977 | Sherer et al. | 266/56 |
| 4,019,016 | 4/1977 | Friedman et al. | 219/60 A X |
| 4,091,514 | 5/1978 | Motes-Conners et al. | 228/29 |

Primary Examiner—Gil Weidenfeld
Assistant Examiner—K. J. Ramsey
Attorney, Agent, or Firm—Guy E. Matthews

[57] ABSTRACT

Apparatus comprising a frame disposable in spaced relationship about a pipe uses a ring mounted thereon for carrying a welding head around the pipe. A welding torch is provided on the head for movement into the welding area to form a weld about the pipe during rotation of the ring.

25 Claims, 30 Drawing Figures fig. 2 fig. 1 fig.3A fig.3B fig.3C fig.4 fig. 7 fig. 8 fig. 9 fig.10 fig.12 fig.11 fig.13 fig.19 fig.20 fig.18 fig. 26 fig. 25 fig. 27 fig. 28

PIPE WELDING APPARATUS

This is a Continuation of application Ser. No. 895,119, filed Apr. 10, 1978, now abandoned.

This apparatus relates to improved apparatus for forming a weld about a horizontally disposed pipe. Such welds are useful, for example, in joining the ends of different pipe sections, in mounting a flange to a pipe or in mounting a pipe tee or elbow sections to a straight section.

In conventional welding apparatus, a track is mounted around the pipe a distance from its dressed end. A carriage travels along the track and has an adjustable arm extending in the direction of the pipe axis to carry a radially adjustable mount which supports a device for oscillating the torch relative to the end.

This prior art device is inefficient in forming a weld around the pipe because of its inability to permit adjustment of the torch tip in the groove being welded in a direction radially toward the pipe axis without also requiring adjusting in the axial direction. An operator must therefor manipulate both handwheels controlling the radial and axial movement of the tip while the tip is moving around the pipe.

Further, this prior art device cannot move the tip in all of the directions necessary to enable a technician to use the machine to weld a vertical groove around a horizontally disposed pipe.

Further, this prior art device requires the track to be disposed around the pipe within relatively close tolerances to the groove being welded for operation.

Further, this prior art device requires the groove being joined to be dressed because of its inability to move the tip in the appropriate directions.

Further, this prior art device requires the ends forming the groove to be aligned within relatively close tolerances by using back-up or line-up clamps because of its inability to move the tip in the appropriate directions.

Further, with this prior art device, it is difficult to prevent the formation of icicles because of its inability to move the tip in the appropriate directions as well as the slowness in adjusting the tip in the directions that the tip can be moved in.

Accordingly, it is an object of this invention to provide welding apparatus that can position its tip in the groove by adjusting the tip in any one of the three directions without requiring compensating adjustments to be made in the other directions.

Further, it is an object of this invention to provide welding apparatus that can adjust its tip in eight parameters for welding a vertical groove around a horizontally disposed pipe. These parameters control the movement of the tip to allow tracking the groove across its width, to move the tip in and out of the groove, to adjust the tilt of the tip, to adjust the width of oscillation of the tip, to adjust the amount of dwell by the tip at each side and center of the groove, to adjust the speed of oscillation of the tip across the groove, to adjust the angle of the tip along the pipe axis, and to adjust the speed at which the tip is moved around the pipe.

Further, it is an object of this invention to provide controls for the welding apparatus which enable a technician to observe the weld and control these adjustments through a hand held control box or pendant.

Further, it is an object of this invention to provide welding apparatus which can be moved along the pipe after the weld has been completed as well as to position the apparatus sufficiently near the groove to permit a weld by machine adjustment only.

These and other objects are accomplished, in accordance with the illustrated embodiment of the invention, by welding apparatus which comprises a frame having means for fixedly clamping it about the pipe. A ring is mounted on the frame for rotation coaxially about the pipe and means are used for moving the ring about the pipe. A welding head is mounted on the ring for movement therewith about the pipe, and a gauge wheel mounted on the head is yieldably urged against the pipe so that it will follow the contour of the pipe as the head rotates with the ring. A welding torch is provided which has a tip mounted on the head for movement in an imaginary plane which lies generally through the axis of the pipe and the wheel-pipe engaging location, and means are provided for adjusting the tip in one of two directions within the plane without requiring compensating adjustment in the other direction caused by movement of the head around the pipe.

In the drawings, wherein like reference characters are used throughout to designate like parts.

Figure 1:
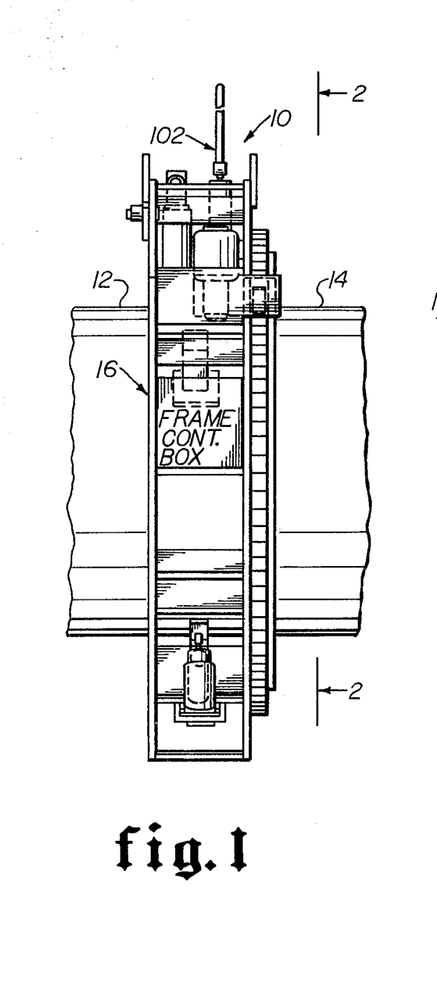
FIG. 1 is a side elevational view of an embodiment of the present invention mounted on a pipe.
Figure 2:
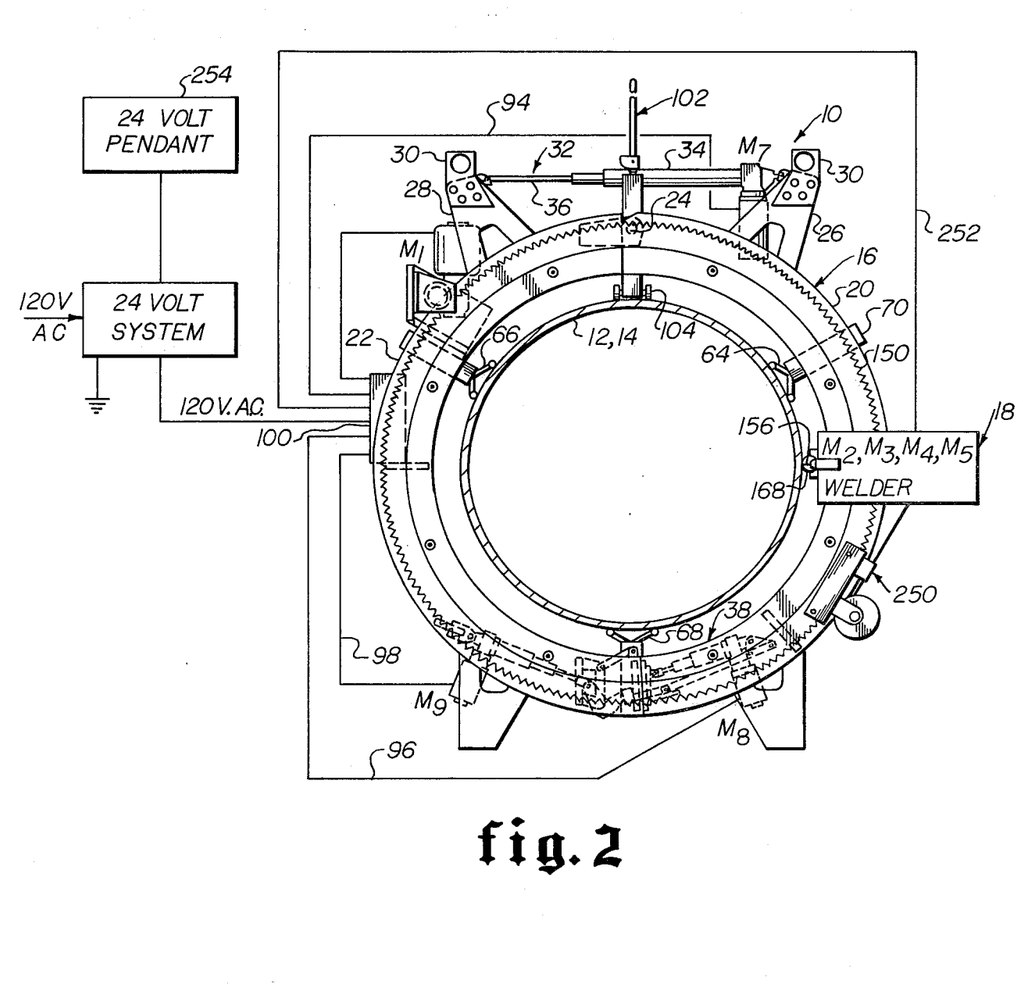
FIG. 2 is a front elevational view of the invention shown in FIG. 1 taken in the direction of arrows 2—2.
Figure 3A:
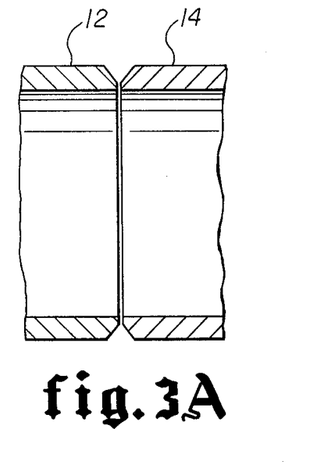
FIGS. 3A, 3B, and 3C are elevational views of welds which the present invention is capable of accomplishing, the view being in the imaginary plane which lies through the axis of the pipe and the wheel-pipe engaging location.
Figure 3B:
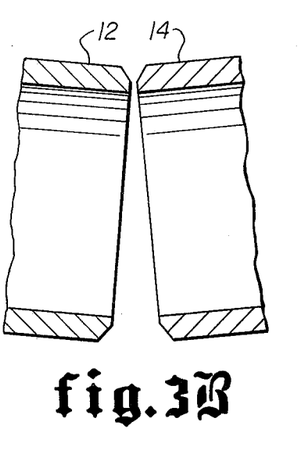
Figure 3C:
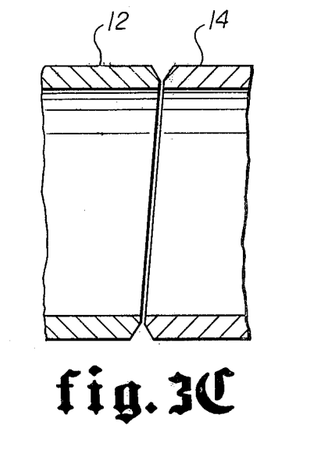

Turning now to FIGS. 1 and 2, an exemplary embodiment 10 of the present invention is shown mounted on a horizontally disposed pipe 12 for welding its end to the end of a second pipe 14. Apparatus 10 is capable of welding the end of pipe 12 to pipe 14 when the ends are aligned, as shown in FIG. 3A, when they are non-aligned, as shown in FIG. 3B, and when they are extended at an angle relative to the pipe axis, as shown in FIG. 3C. Although the ends of pipe 12 and 14 are shown dressed, it is to be understood that apparatus 10 is capable of welding the ends when undressed.

A frame section 16 of apparatus 10 mounts a welding head section 18 to pipe 12 and includes a cylindrically shaped unit having two arcuate sections 20 and 22, which are pivotally mounted to one another at a pivot point 24. Arms 26 and 28 extend radially from cylindrical sections 20 and 22, respectively, on either side of pivot point 24.

Plates 30 are attached to the top of each arm 26 and 28, and each plate 30 has a hole therein for receiving a hook from a crane or cherry picker to raise and lower apparatus 10 onto or off the pipe.

Figure 4:
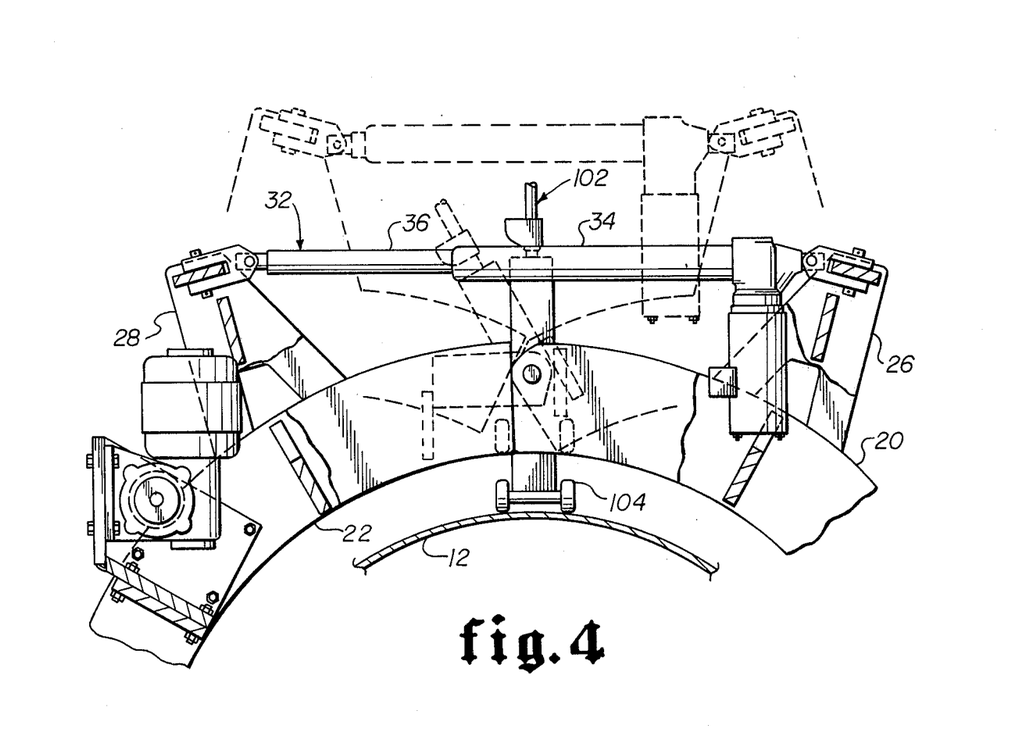
FIG. 4 is an enlarged front elevational view of a portion of the invention which rolls the apparatus along the pipe axis.

A device 32 is mounted between arms 26 and 28 to open and close arcuate sections 20 and 22 around the pipe when mounting and dismounting apparatus 10 to the pipe. This device uses a reversible motor $M_7$ mounted through gears to a screw system within a sleeve 34 pivotally mounted to arm 26 for moving rod 36 pivotally mounted to arm 28 longitudinally of the sleeve and thereby open and close sections 20 and 22 by moving arms 26 and 28. As shown in FIG. 4, when arms 26 and 28 are pulled toward one another, sections 20 and 22 are in the opened position (dotted outline); and when pushed apart, frame 16 is closed (solid outline). For mounting frame 16 to the pipe, arms 24 and 26 are pulled toward one another by motor $M_7$; the frame is then lowered down onto the pipe by use of lifting plates 30; and arms 24 and 26 are moved away from one another by reversing the motor to thereby close sections 20 and 22 around the pipe.

Figures 5, 6:
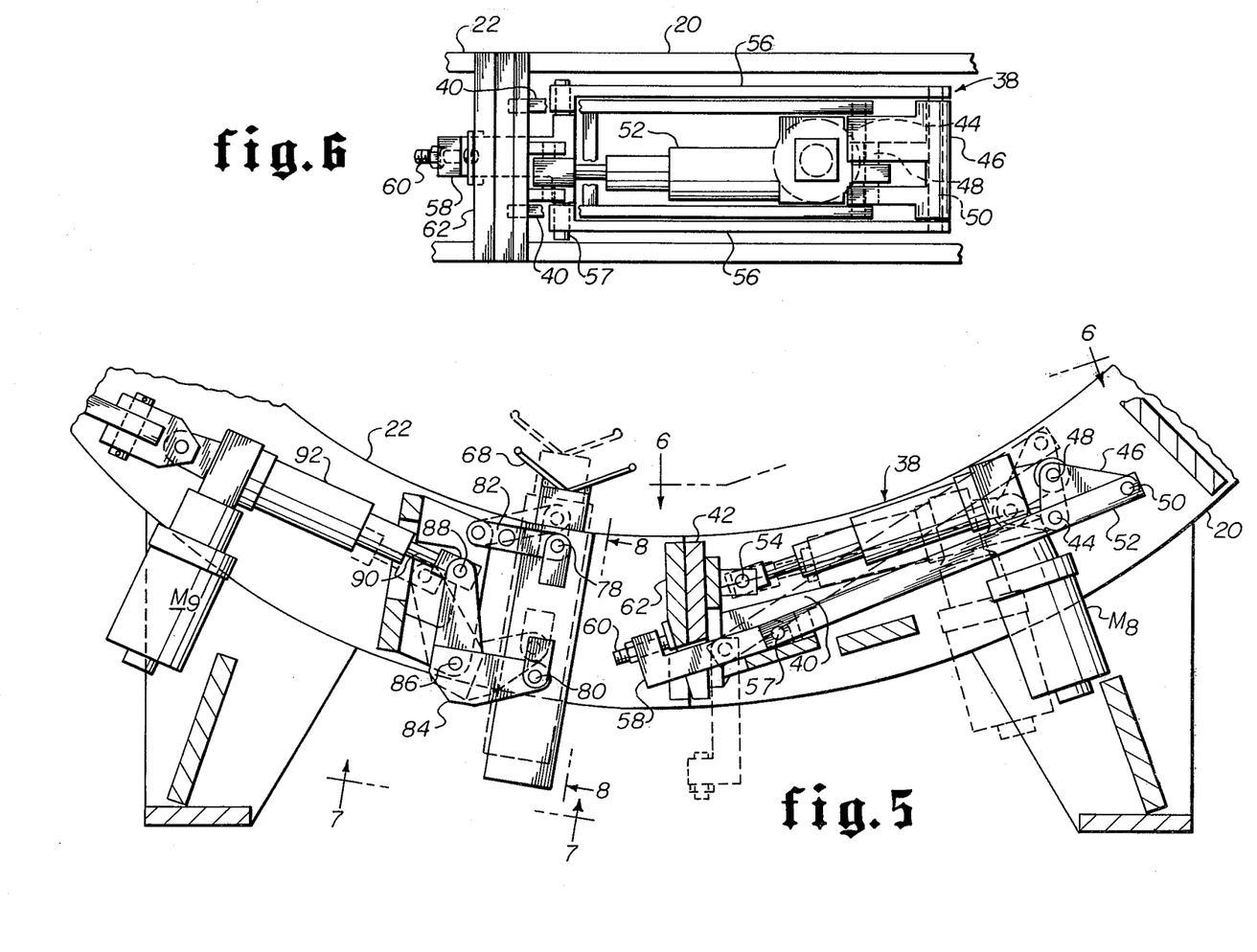
FIG. 5 is an enlarged front elevational view of two portions of the invention which latch the frame around and clamp it to the pipe.
FIG. 6 is a view of one portion of the invention shown in FIG. 5, taken in the direction of arrows 6—6.
Figures 7, 8, 9:
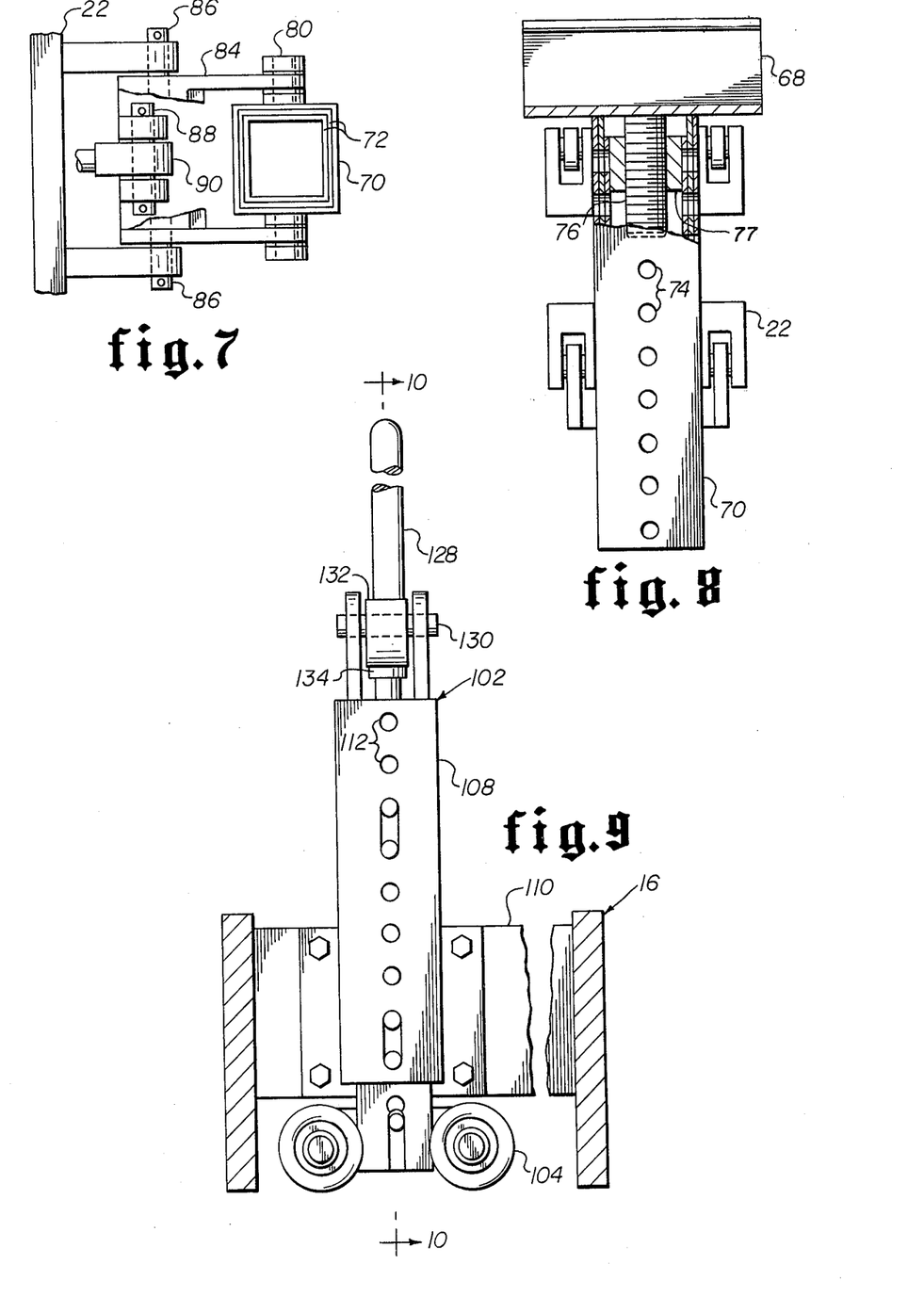
FIG. 7 is a view of the other portion of the invention shown in FIG. 5, taken in the direction of arrows 7—7.
FIG. 8 is a view, partly in section, of the portion of the invention shown in FIG. 5, taken in the direction of arrows 8—8.
FIG. 9 is an enlarged side elevational view of the device for rolling the invention along the pipe axis.
Figure 10:
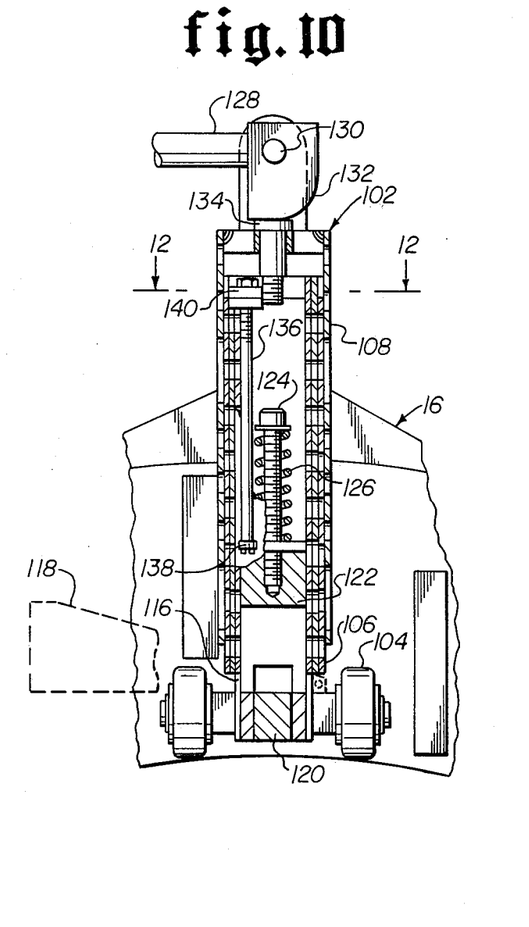
FIG. 10 is a view of the device shown in FIG. 9, taken in the direction of arrows 10—10.
Figure 11:
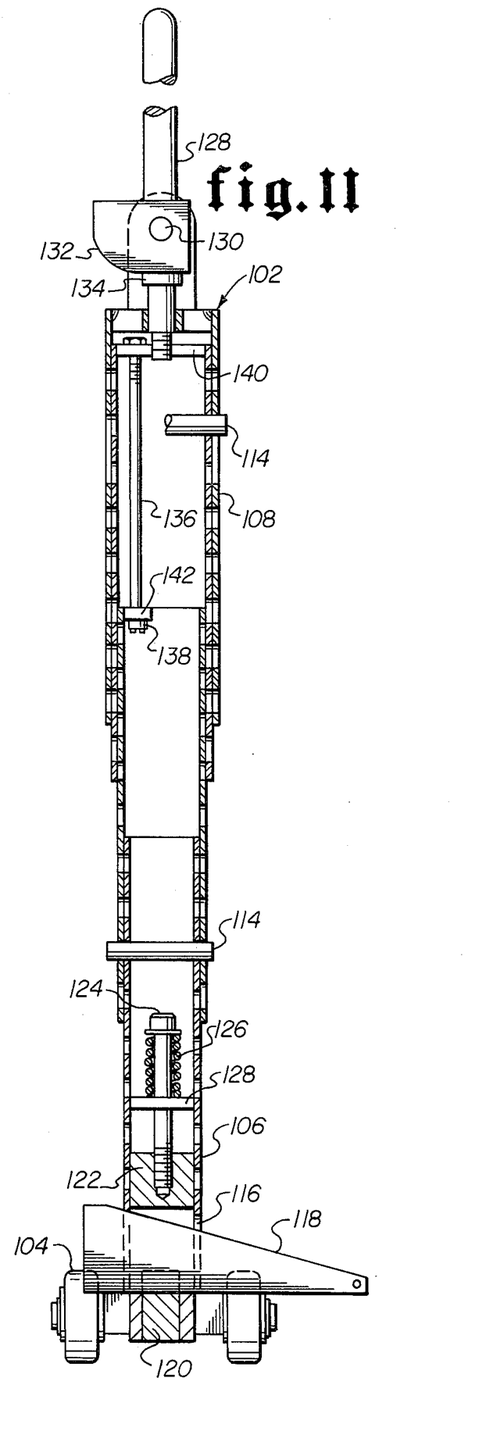
FIG. 11 is a view of the device shown in FIG. 10 when in an extended position.
Figure 12:
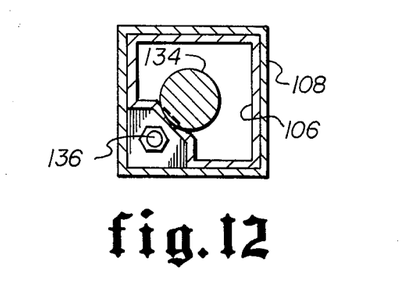
FIG. 12 is a view of the device shown in FIG. 10, taken in the direction of arrows 12—12.
Figure 13:
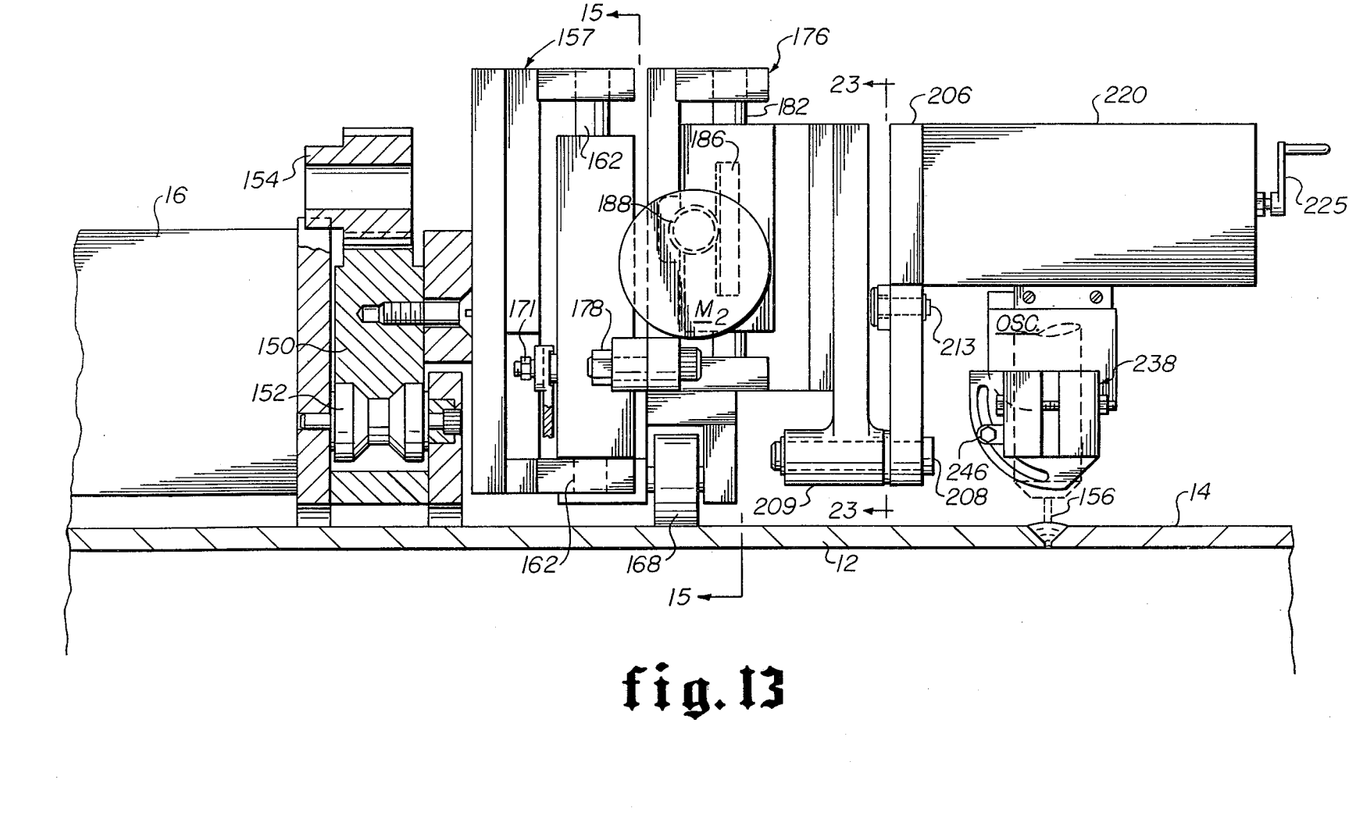
FIG. 13 is an enlarged side elevational view of the welding head of the invention shown in FIG. 1.
Figure 14:
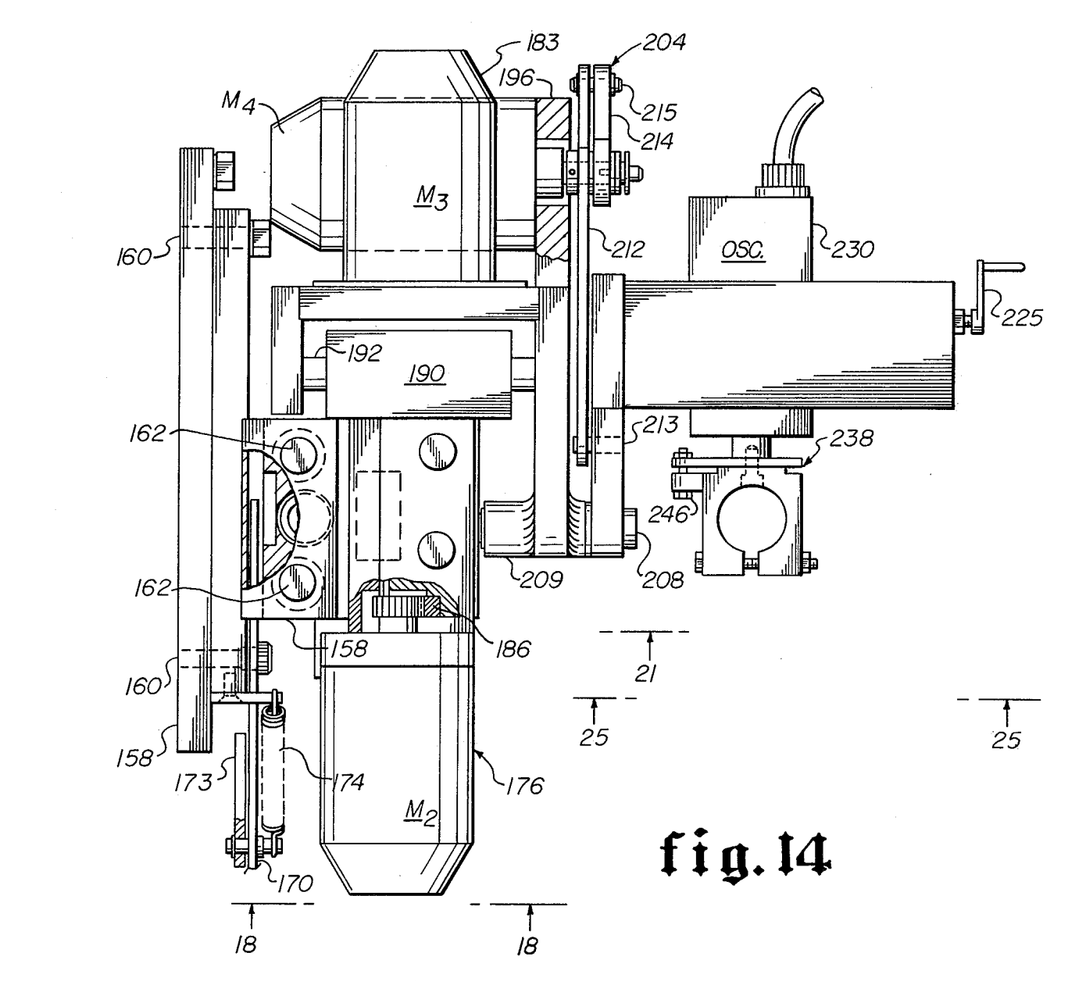
FIG. 14 is a plan view of the welding head shown in FIG. 13.
Figure 15:
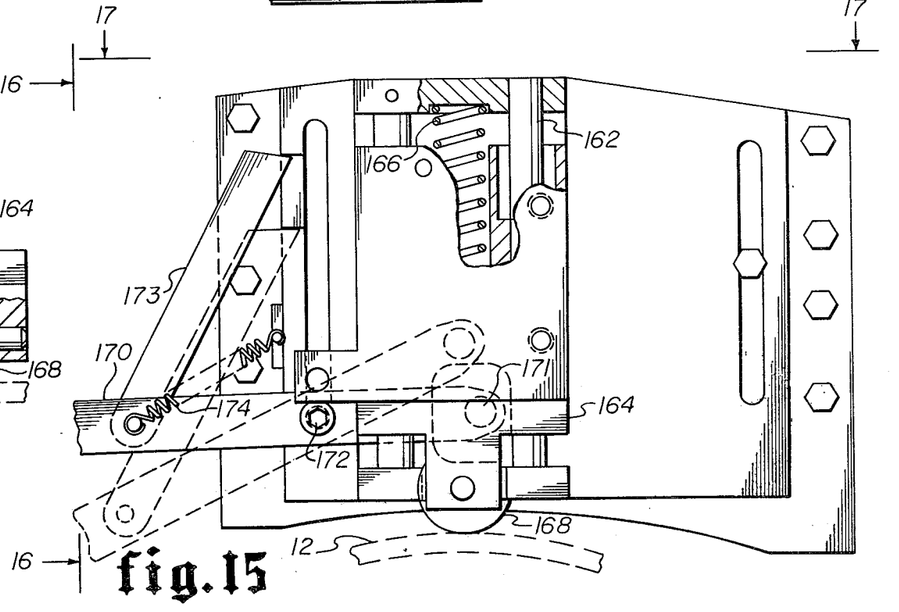
FIG. 15 is an enlarged view, partly in section, of a means for mounting a gauge wheel which references the welding tip, as taken in the direction of arrows 15—15 of head shown in FIG. 13.
Figure 16:
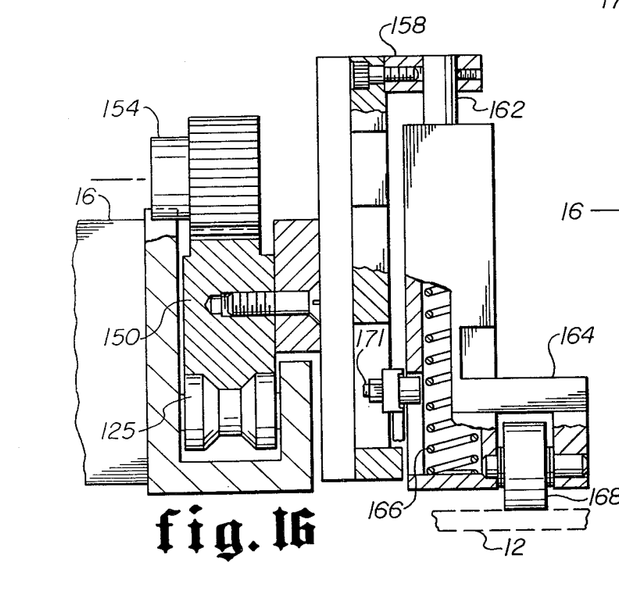
FIG. 16 is a view, partly in section, of the gauge wheel mount shown in FIG. 15, taken in the direction of arrows 16—16.
Figure 17:
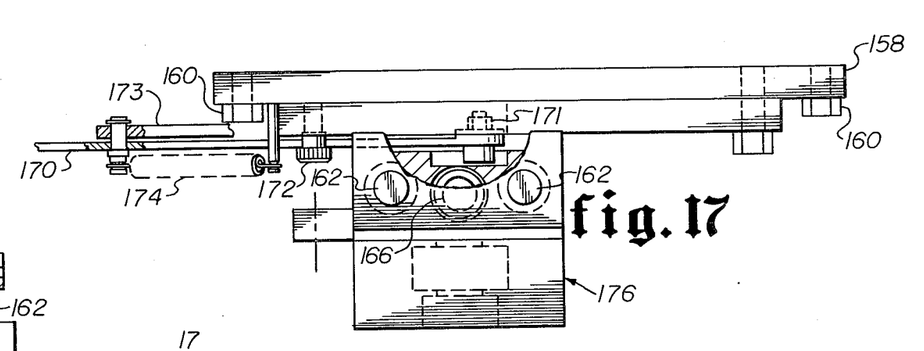
FIG. 17 is a view, partly in section, of the gauge wheel mount shown in FIG. 15, taken in the direction of arrows 17—17.
Figure 18:
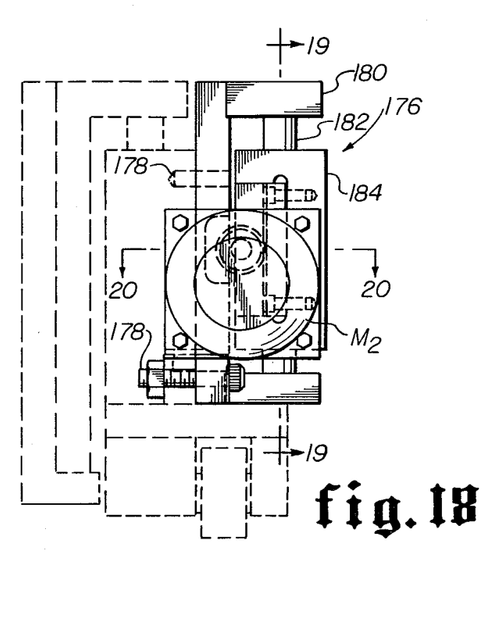
FIG. 18 is a view of a means for moving the welding tip toward and away from the pipe, as taken in the direction of arrows 18—18 of the head shown in FIG. 14.
Figures 19, 20:
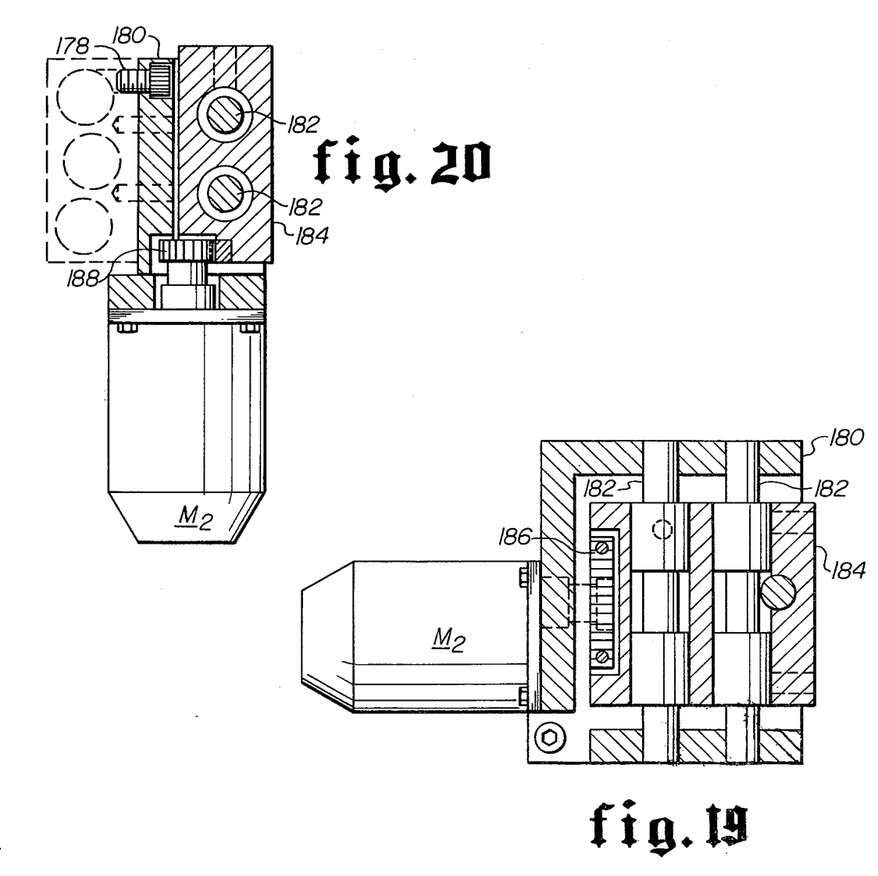
FIG. 19 is a view, partly in section, of the device shown in FIG. 18, taken in the direction of arrows 19—19.
FIG. 20 is a view, partly in section, of the device shown in FIG. 18, taken in the direction of arrows 20—20.
Figures 21, 22, 23, 24:
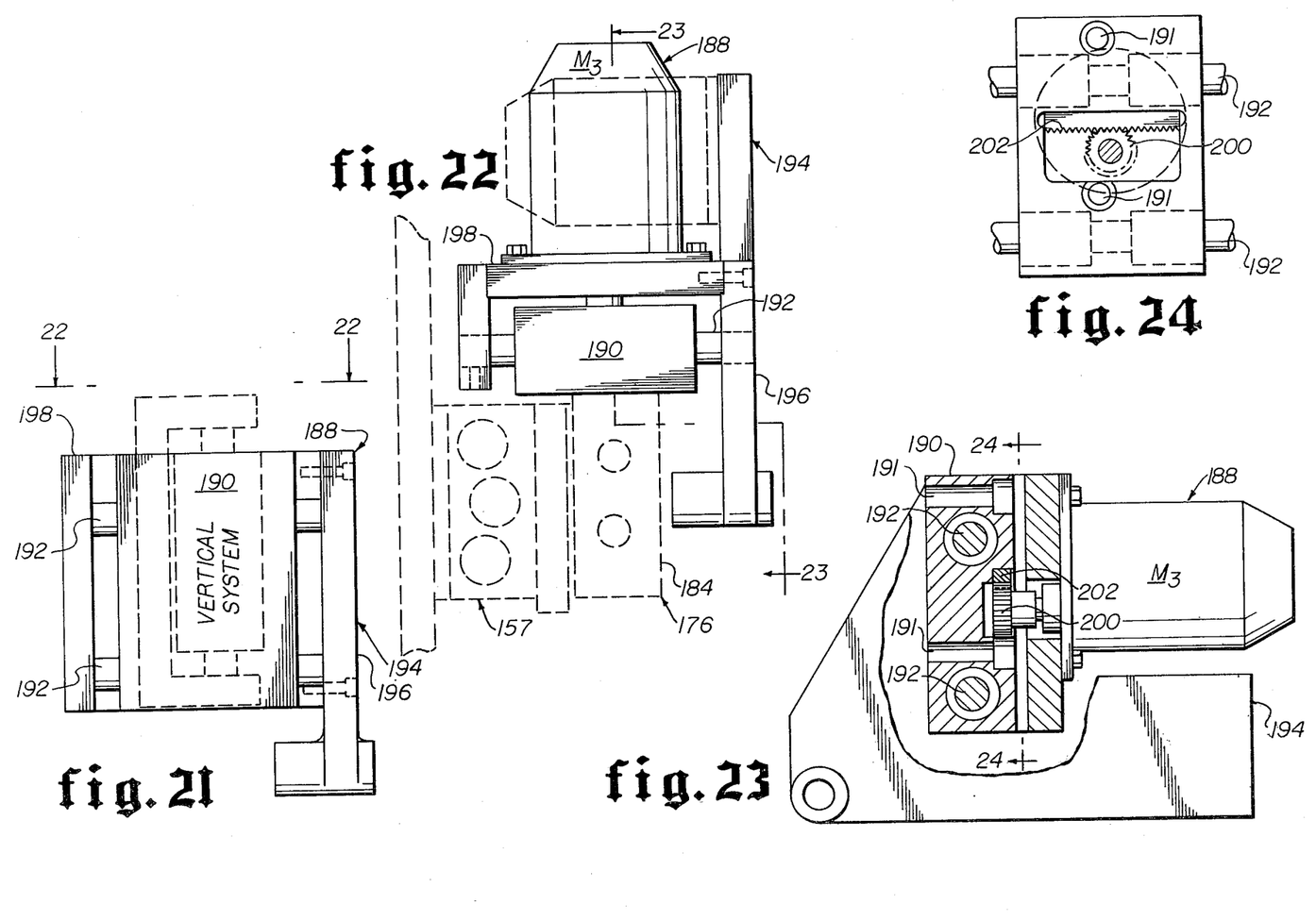
FIG. 21 is a view of a means for moving the welding tip toward and away from the gauge wheel along the pipe axis, as taken in the direction of arrows 21—21 of the head shown in FIG. 14.
FIG. 22 is a view of the device shown in FIG. 21, taken in the direction of arrows 22—22.
FIG. 23 is a view, partly in section, of the devices shown in FIGS. 13 and 22, taken in the direction of arrows 23—23.
FIG. 24 is a view, partly in section, of the device shown in FIG. 23, taken in the direction of arrows 24—24.

As seen in FIGS. 2, 5, and 6, a latching mechanism 38 is provided in the lower portion of frame 16 to connect section 20 to 22. This mechanism has support arms 40 cantilevered from a cross-brace 42 mounted on section 20 of frame 16 at the opening between sections 20 and 22. An axle 44 for supporting a crank 46 extends between arms 40 at the free ends thereof. Crank 46 is of generally triangular cross section with axle 44 extending through one corner; an axle 48 extends through the second corner; and an axle 50 extends through the third corner. Axle 48 supports a reversible motor $M_8$ having a mechanical screw linkage 52 mounted therewith which operates against a pivotal mount 54 attached to cross brace 42. Axle 50 extends between arms 56 at one end thereof, and the other end of the arms is pivotally attached by pin 57 to an L-shaped member 58 with an adjusting screw 60 provided in the foot of the L-shaped member 58 for bearing against a cross brace 62, which is mounted on section 22 at the opening between sections 20 and 22. To attach section 20 to section 22, L-shaped member 58 is moved from the dotted outline position shown in FIG. 5 to the solid outline position by rotation; motor $M_8$ is then activated to turn mechanical screw linkage 52 and pivot crank 46 from the dotted position to the solid position, which pulls screw 60 into engagement and thereby latch sections 20 and 22 one to the other.

As shown in FIGS. 2, 5, 7, and 8, two upper shoes 64 and 66 and a bottom shoe 68 are provided to support frame 16 concentrically about the pipe. Shoes 64, 66, and 68 are provided with an outer sleeve 70 and telescoping inner sleeves 72, which slide within outer sleeve 70 to position frame 16 concentrically about the pipe. Holes 74 are provided in the sleeves on one inch centers to permit insertion of a pin therein and support the shoes radially toward the pipe to thereby generally position the shoes around the pipe. A screw 76 is attached to the shoes and threadably engages a nut 77 supported by each innermost sleeve 72 for fine adjustment of the shoes between the one inch centers permitted by holes 74. In addition to outer sleeve 70, inner sleeves 72, and holes 74, bottom shoe 68 is pivotally moved into and out of a clamping position shown in dotted outline in FIG. 5. This pivotal movement is obtained by pivotally connecting outer sleeve 70 to rods 78 and 80, rod 78 being connected by linkage 82 to frame section 22 and rod 80 being connected by an L-shaped linkage 84, which is pivotally mounted at the junction of the two arms of the linkage 84 by a pin 86 to frame section 22. The end of the other arm of linkage 84 is connected by pin 88 to rod 90 of the drive apparatus 92 which is operated by reversible motor $M_9$, mounted to frame 16. Thus, bottom shoe 68 moves into and out of engagement with the bottom side of the pipe by activation of motor $M_9$. By knowing the pipe radius and adjusting the telescoping inner sleeves 74 relative to outer sleeve 72 until holes 74 are aligned for the last full inch and the pin is inserted, through the holes, the shoes are then turned to rotate screw 76 in nut 77 to obtain the spacing adjustment when the pipe radius is not in even inches. Motor $M_9$ is then activated for movement of rod 90 away from the motor and bottom shoe 68 engages the pipe to force the frame into concentric alignment about the pipe.

Motors $M_7$, $M_8$, and $M_9$ are preferably electric motors connected through conductors 94, 96, and 98, respectively, to appropriate circuitry in a frame control box 100 to permit opening and closing of frame sections 20 and 22 around the pipe, latching and unlatching of the frame sections together and clamping and unclamping of frame 16 to the pipe from a single location. Thus, apparatus 10 is moved to the welding site, as with a crane, opened by switching motor $M_7$ to its opening mode, lowering apparatus 10 onto the pipe until upper shoes 64 and 66 rest on the pipe and then closing frame sections 20 and 22 around the pipe by switching motor $M_7$ to its closing mode. Frame sections 20 and 22 are then latched by positioning screw 60 in L-shaped member 58 against cross brace 62 and motor $M_8$ is switched into the latching mode. Should frame 16 be at the proper location relative to the groove to be welded, it is clamped to the pipe by switching motor $M_9$ to its clamping mode, which forces bottom shoe 68 into engagement with the bottom side of pipe 12 and thereby supports frame 16 concentrically about the pipe. To remove apparatus 10 from the pipe, this procedure is simply reversed. By arranging the control apparatus in a single control box, frame 16 can be mounted, latched, and clamped to the pipe by a single operator. Moreover, an interlock system may be provided in the circuitry within box 100 to ensure those things have been accomplished before beginning to weld which aids in preventing accidents.

After a weld has been completed, it may be desirable to move frame 16 down the pipe to the next welding site. This may be accomplished by mounting a roller mechanism 102 on the upper portion of frame 16 as shown in FIGS. 1, 2, 4, and 9–12. Rollers 104 are mounted to telescoping inner sleeves 106 supported within an outer sleeve 108 which is attached to a cross brace 110 of frame 16. As shown, a plurality of holes 112 extends through the sleeves for adjusting the position of rollers 104 relative to the frame by aligning the holes and inserting pins 114 therein, which holds the inner sleeves in the telescoped position shown in FIG. 11. A slot 116 extends through the innermost sleeve 106 for receiving a wedge 118 to act upon a member 120, which supports wheels 104. A plug 122 is movable with wheels 104 is mounted to a bolt 124 with spring 126 acting against bracket 128 for continuously urging wheels 104 upwardly away from pipe 12. Wedge 118 is inserted through slot 116 to counteract the urging of spring 126 to move wheels 104 further away from the end of innermost sleeve 116 to permit fine adjustment of roller mechanism 102 for different diameters of pipe to which frame 16 is mounted. Wheels 104 extend down to and engage with the pipe by moving a handle 128 about pivot point 130 which acts through a cam 132 on follower 134 to force wheels 104 against the pipe and thus lift frame 16 off the pipe. An elongated bolt 136 with head 138 is mounted interiorly of innermost sleeve 116 to a plate 140; the head acts as a stop by engaging a slide 142 carried by one of the telescoping sleeves which prevents separation of inner sleeve 106 from outer sleeve 108.

As best seen in FIGS. 1, 2, 13, and 14, welding head 18 is mounted to a ring gear 150 rotatably supported concentrically around pipe 12 by rollers 152 which are eccentrically mounted to frame 16 to permit adjustment through wear of the ring gear and rollers. A reversible motor $M_1$ is mounted to frame 16 for turning a drive gear 154 and thus carrying a welding electrode or tip 156 around the pipe being welded.

An out-of-round apparatus 157, best seen in FIGS. 13–17, is provided on head 18 and has a support member 158 attached to ring gear 150 as with bolts 160. Extending radially toward the pipe axis from member 158 are rods 162 about which an L-shaped support body 164 is mounted. A spring 166 is disposed between rods 162 within body 164 to urge a gauge wheel 168 rotatably mounted therein into engagement with the pipe for following the contour of the pipe. Thus, body 164 is raised and lowered as the contour of the pipe varies around its circumference. It has been found that by running an axis parallel to the pipe axis from the contact location between the wheel and pipe, a reference axis is obtained which permits tip 156 to be adjusted in one of two directions within an imaginary plane which lies through the pipe axis and the contact location of the wheel and pipe without requiring compensating adjustment in the other direction caused by movement of the tip around the pipe.

It is possible that wheel 168 can be damaged by moving apparatus 10 along the pipe axis, so one end of a lever 170 is mounted by pin 171 to body 164, and intermediate of the other end, lever 170 is pivotally connected by pin 172 to member 158 for raising gauge wheel 168 out of engagement with the pipe. A second arm 173 is pivotally mounted outwardly of pin 172 with a spring 174 urging arm 173 toward engagement with slots in body 158, which enables wheel 168 to be locked in the disengaged position shown in dotted outline in FIG. 15.

As best seen in FIGS. 13, 14, and 18–20, a first apparatus 176 is provided on head 18 for moving tip 156 radially toward and away from the pipe axis and is mounted to body 164, as with bolts 178. Radial moving apparatus 176 includes a C-shaped bracket 180 supporting two carrying rods 182, which extend between the two arms of the C-shaped bracket. A support member 184 is slidably mounted around rods 182 and has a gear rack 186 provided thereon. A reversible motor $M_2$ is mounted with C-shaped bracket 180 and carries a pinion gear 188 connected to the motor's drive shaft for engaging rack 186 and thereby moving support member 184 radially toward and away from the pipe axis.

A second apparatus 188 is provided on head 18 for moving tip 156 along the axis of the pipeline toward and away from gauge wheel 168 is best seen in FIGS. 13, 14, and 21–24. This apparatus includes a body 190 attached to movable body 184 of apparatus 176, as with bolts provided in bolt holes 191. Movable carrying rods 192 extend through support body 190 and lie along the axis of the pipe for directing movement of apparatus 188 therealong. A support bracket 194 is mounted to rods 192 with one end of the rods disposed in a plate portion 196 extending transversely to the pipe axis and the other end of the rods disposed in the foot of a generally L-shaped portion 198. A reversible motor $M_3$ is mounted to the elongated leg of L-shaped portion 198 and has its drive shaft extending therethrough for turning a pinion 200 matingly engaged with a rack 202 provided in support 190. Thus, rods 192, support frame 194, and motor M₃ are moved relative to body 190, which in turn moves tip 156 along the pipe axis.

As best seen in FIGS. 13, 14, and 25–28, a third apparatus 204 is provided on head 18 for tilting tip 156 substantially perpendicular to the imaginary plane about a tilt axis extending generally parallel to the pipe axis and passing approximately through the engagement of wheel 168 with the pipe. This is accomplished by mounting a corner of a follower member 206 about a pin 208 disposed in a housing 209 at the front of plate portion 196. A drive arm 212 is mounted to follower 206 by a pin 213 for providing pivotal movement about rod 208. A reversible electric motor M₄ is mounted to the plate portion 196, and one end of a crank 214 is attached to a drive arm 212 by pin 215 for tilting member 206 about pin 208, as shown by arrow 216 in FIG. 27.

Figure 26:
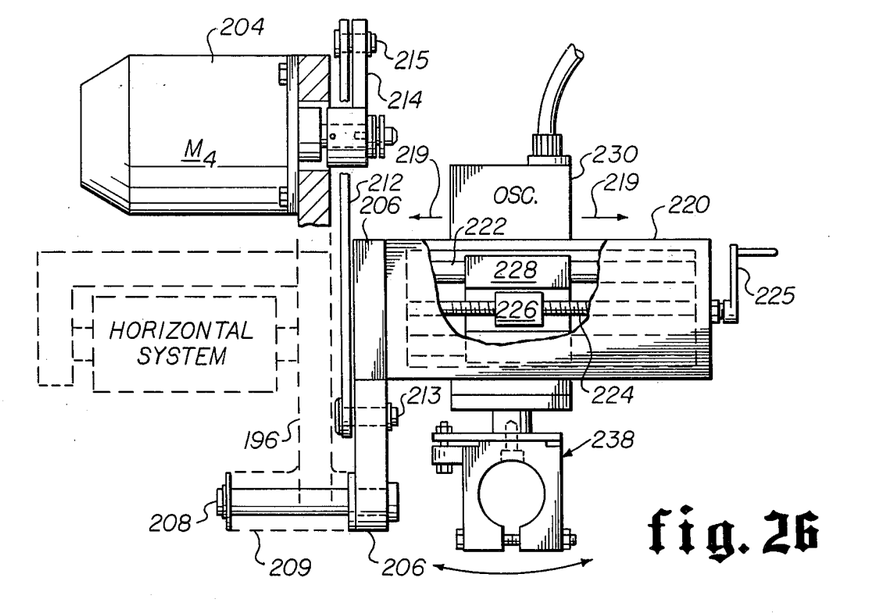
FIG. 26 is a view, partly in section, of the device shown in FIG. 25, taken in the direction of arrows 26—26.
Figure 27:
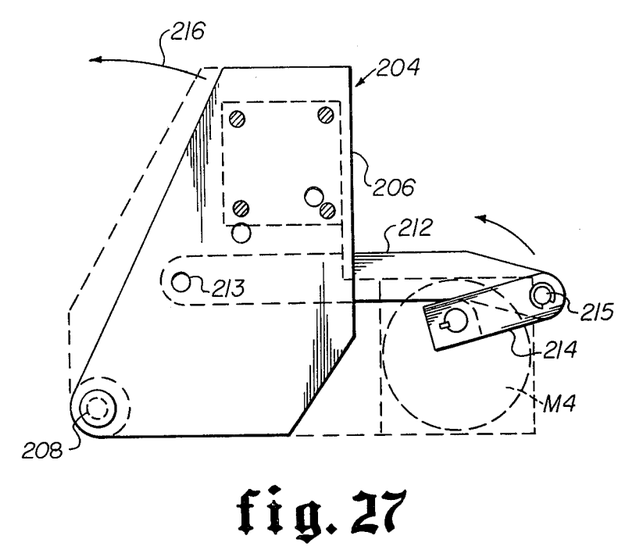
FIG. 27 is a view of the device shown in FIG. 25, taken in the direction of arrows 27—27.
Figure 28:
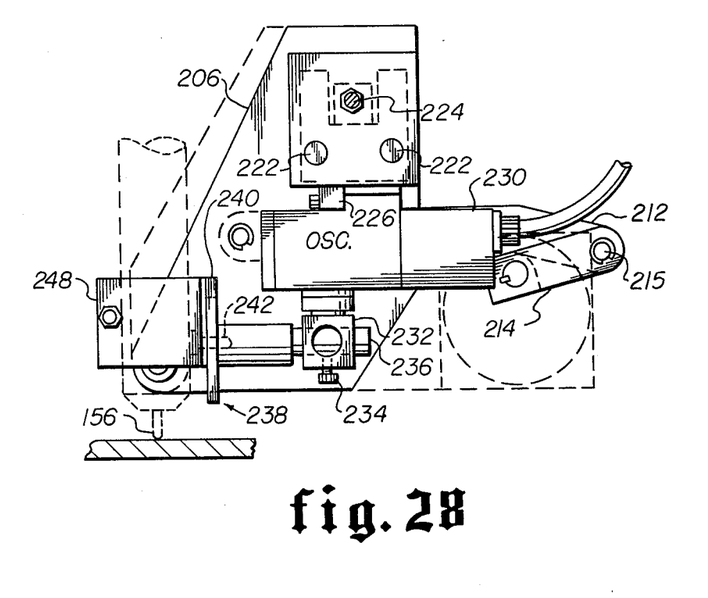
FIG. 28 is a view of the device shown in FIG. 25, taken in the direction of arrows 28—28.

Apparatus 218 is also provided on head 18 for adjusting the position of tip 156 along the pipe axis to the welding area after frame 16 has been clamped to the pipe, as shown by arrows 219 in FIG. 26. This adjusting apparatus includes a bracket 220 mounted on follower member 206 which supports guide rods 222 and drive screw 224 extending generally along the pipe axis.

A hand crank 225 is mounted on bracket 220 for turning drive screw 224 which has a bolt drive member 226 engaging the threads of screw 224. A yoke 228 is slidably disposed around rods 222 and has shoulders extending into engagement with bolt drive member 227 for movement therewith as crank 225 is turned. This arrangement permits the frame to be mounted on the pipe with permissible greater tolerances between the weld area and frame.

Apparatus 230 is also provided on head 18 for oscillating electrode 156 relative to the pipe. This apparatus is mounted to yoke 228 and includes a housing 230 supporting an oscillating motor M₅ and electrical circuitry controlling the oscillating speed and dwell time, an example of such apparatus being Model WV3-II sold by Gullco International, Inc. An oscillating bracket 232 extends from housing 230 and has a set screw 234 for locking an arm 236 therein.

Figure 25:
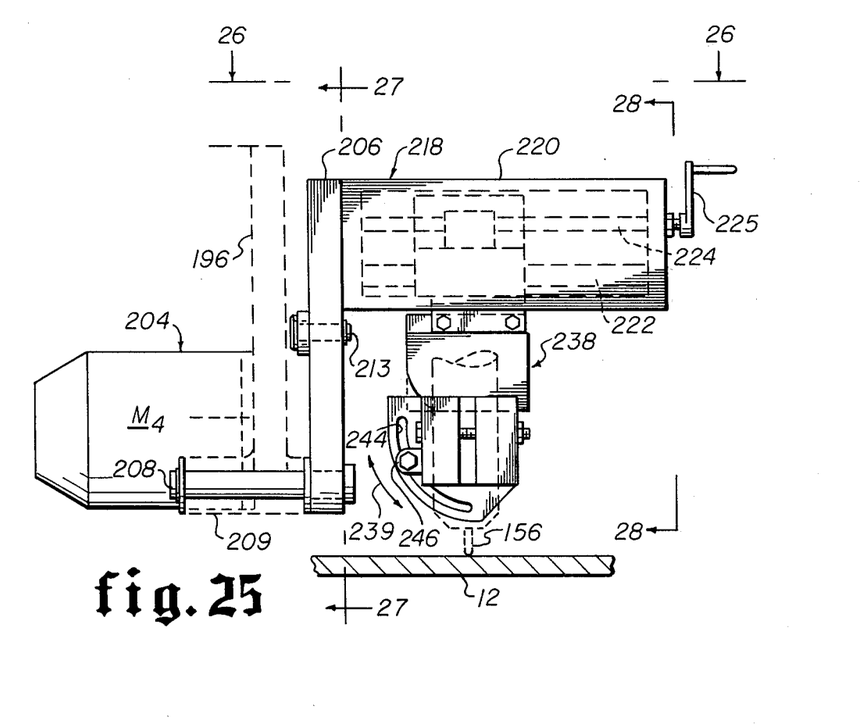
FIG. 25 is a view of a means for tilting the welding tip about a tilt axis extending generally parallel to the pipe axis and passing approximately through the engagement of the wheel with the pipe, of a means for adjusting the position of the tip along the pipe axis to the welding area, of a means for oscillating the tip back and forth along the pipe axis and tilt mount for moving the tip about an axis extending substantially perpendicular to the imaginary plane, as taken in the direction of arrows 25—25 of the head shown in FIG. 14.

Apparatus 238 is further provided in head 18 for tilting tip 156 at an angle within the imaginary plane about an axis extending perpendicular to the imaginary plane, as shown by arrow 239 in FIG. 25. This apparatus includes a body 240 mounted to arm 236, as with bolt 242, an arcuate slot 244 is provided in body 240 for engaging with a locking bolt arrangement 246 mounted to a torch mounting head assembly 248. This positioning may be used when the walls of the pipe are rather thick, and it is necessary to fill some of the groove or gap in order to join the ends of the pipe.

The welding apparatus is preferably an electrical apparatus using a wire for electrode 156 which is carried on a wire feeder 250 mounted on ring 150, as shown in FIG. 1. An example of such apparatus which further has a multiple inert gas welding capability is model No. 650cv or RC250cv and wire feeder Linear II, both sold by Hobart.

As shown in FIG. 1, motors M₁, M₂, M₃, M₄, and M₅ as well as wire feeder 250 have electrical circuitry 252 interlocked with control box 100 to prevent operation until frame 16 is closed, latched, and clamped to the pipe. And all of these motors are controlled by circuitry in a pendant control box 254, which is used by an operator observing the weld being made. Further, the pendant can include controls to the wire feed rate, a jog-purge, a rapid traverse to move the head rapidly about the pipe as well as controlling each movement of the electrode around the pipe formed by movement of wheel 168 around the pipe, toward and away from the pipe in all of the selected planes along the axis of the pipe, the tilt of the tip relative to the pipe, oscillation rates and dwell times, and weave width to thus control the various directions of movement used in vertically welding a horizontally disposed pipe.

By using pendant 251, a skilled technician can control motors M₁, M₂, M₃, M₄, and M₅, which moves tip 156 in the various directions that substantially duplicate a skilled welder's manipulation of the hand held welding torch. However, the technician has the capability of this manipulation after the manual welder is tired and cannot continue duplicating his less tired manipulation of the tip.

To move apparatus 10 from welding area to welding area, motor M₉ withdraws bottom shoe 68 from engagement with pipe 12 to thereby rest frame 16 by upper shoes 64 and 66 on the upper portion of the pipe. Handle 128 of apparatus 102 is moved around pin 130 to force wheels 104 against the upper portion of the pipe and frame 16 is raised off the pipe to be rolled over the weld, down pipe 14 to the next weld area for clamping around the pipe and welding this area as previously described.

From the foregoing, it will be seen that this invention is one well adapted to attain all of the ends and objects hereinabove set forth, together with other advantages which are obvious and which are inherent in the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Pipe welding apparatus, comprising:
   a frame having means for fixedly clamping it concentrically about the pipe,
   a ring mounted on the frame for rotation coaxially about the pipe,
   means for moving the ring about the pipe,
   a welding head mounted on the ring for movement therewith about the pipe, comprising:
   a gauge wheel,
   means mounting the gauge wheel for rotation,
   means for mounting the gauge wheel mounting means for rotation with the ring in a generally parallel plane a fixed distance from the rotational plane of the ring,
   means for yieldably urging the gauge wheel mounting means inwardly to force the gauge wheel against the pipe so that the gauge wheel mounting means will follow the contour of the pipe as the head rotates with the ring,
   a welding torch having a tip mounted with the gauge wheel mounting means for movement in an imaginary plane which lies through the axis of the pipe and the wheel pipe engaging location, and
   power energized means mounted with the gauge wheel mounting means for adjusting the tip radially and axially of the pipe axis in the imaginary plane, whereby the gauge wheel moves the tip and tip adjusting means radially of the pipe axis in response to out-of-roundness of the pipe as the gauge wheel is rotated about the pipe and the tip may be adjusted axially and radially of the pipe axis independently of the gauge wheel.

2. Apparatus of the character defined in claim 1, including:
a control pendant capable of being used and carried by a single operator and means mounted on the pendant for controlling at least one of the tip adjusting means, the tip adjusting means, the tip being positioned within the weld area by manipulation of the control means by the operator observing the weld area.

3. Apparatus of the character defined in claim 1, including:
means for retracting the gauge wheel out of contacting relation with the pipe.

4. Apparatus of the character defined in claim 1, including:
power energized means mounted with the ring moving means for controlling the speed and direction of movement of the ring.

5. Apparatus of the character defined in claim 4, including:
a control pendant capable of being used and carried by a single operator and means mounted on the pendant for controlling the ring moving means, the tip being positioned within the weld area by manipulation of the control means by the operator observing the weld area.

6. Apparatus of the character defined in claim 1 wherein the radial moving means includes a guide rod mounted on the gauge wheel mounting means extending radially from the pipe axis, a body slidably mounted on the rod, a rack mounted on the body, a pinion matingly engaged with the rack and a reversible motor mounted to the pinion for moving the tip toward and away from the pipe axis.

7. Apparatus of the character defined in claim 1, wherein the axial moving means includes a body mounted on the radial moving means, a rack mounted on the body, a guide rod slidably mounted in the body extending axially along the pipe axis, a support frame mounted on the rod for axial movement, a pinion matingly engaging the rack, and a reversible motor mounted on the support frame and to the pinion for moving the tip toward and away from the wheel along the pipe axis.

8. Apparatus of the character defined in claim 1, including:
power energized means on the head for tilting the tip about a tilt axis extending generally parallel to the pipe axis and passing approximately through the engagement of the wheel with the pipe.

9. Apparatus of the character defined in claim 8, including:
a control pendant capable of being used and carried by a single operator and means mounted on the pendant for controlling the tip tilting means, the tip being positioned within the weld area by manipulation of the control means by the operator observing the weld area.

10. Apparatus of the character defined in claim 8, wherein the tilting means includes a follower arm pivotally mounted to the axial moving means, a reversible motor mounted to the axial moving means, a crank mounted to the drive shaft of the motor, a drive arm mounted to the follower arm and crank, and the torch mounted with the follower arm, the tip being tilted back and forth about the tilt axis by activation of the reversible motor.

11. Apparatus of the character defined in claim 8, including:
mechanical means on the head for adjusting the position of the tip along the pipe axis to the welding area.

12. Apparatus of the character defined in claim 11, wherein the mechanical adjusting means includes a support frame mounted to the tilting means, a guide rod mounted on the support frame extending axially along the pipe axis, a body slidably mounted on the rod, a drive screw threadably mounted in the body extending substantially parallel to the rod for moving the tip along the pipe axis.

13. Apparatus of the character defined in claim 11, including:
power energized means on the head for oscillating the tip back and forth along the pipe axis.

14. Apparatus of the character defined in claim 13, including:
a control pendant capable of being used and carried by a single operator and means mounted on the pendant for controlling the tip oscillating rate and dwell time, the tip being positioned within the weld area by manipulation of the control means by the operator observing the weld area.

15. Apparatus of the character defined in claim 13, wherein the oscillating means includes an arm supporting a torch mount and a motor mounted on the mechanical adjusting means for moving the arm back and forth and thereby oscillating the tip along the pipe axis.

16. Apparatus of the character defined in claim 15, wherein the torch mount includes a body pivotally mounted to the oscillating means arm for tilting the tip of the torch at an angle within the imaginary plane.

17. Apparatus of the character defined in claim 13 or claim 15, including:
a pendant capable of being used and carried by a single operator and means mounted on the pendant for controlling the ring moving means, the tip radial moving means, the tip axial moving means, the tip tilting means, and the tip oscillating rate and dwell time, the tip being positioned within the weld area by manipulation of the control means by the operator observing the weld area.

18. Apparatus of the character defined in claim 17, including:
a wire reel mounted on the ring for providing wire to the torch,
means mounted on the ring for feeding the wire to the torch, and
means mounted on the pendant for controlling the feed rate of the wire by the operator.

19. Pipe welding apparatus, comprising:
a frame having means for fixedly clamping it concentrically about the pipe,
a ring mounted on the frame for rotation coaxially about the pipe,
means for moving the ring about the pipe,
a welding head mounted on the ring from movement therewith about the pipe,
a gauge wheel,
means mounting the gauge wheel on the head, means on the head for yieldably urging the gauge wheel mounting means inwardly to force the gauge wheel against the pipe so that it will follow the contour of the pipe as the head rotates with the ring, a welding torch having a tip mounted on the head for movement in an imaginary plane which lies through the axis of the pipe and the wheel pipe engaging location, and power energized means on the head for adjusting the tip radially and axially of the pipe axis in the imaginary plane, wherein the radial moving means includes a guide rod mounted on the gauge wheel mounting means extending radially from the pipe axis, a body slidably mounted on the rod, a rack mounted on the body, a pinion matingly engaged with the rack and a reversible motor mounted to the pinion for moving the tip toward and away from the pipe axis.

20. Pipe welding apparatus, comprising:

a frame having means for fixedly clamping it concentrically about the pipe, a ring mounted on the frame for rotation coaxially about the pipe, means for moving the ring about the pipe, a welding head mounted on the ring for movement therewith about the pipe, a gauge wheel, means mounting the gauge wheel on the head, means on the head for yieldably urging the gauge wheel mounting means inwardly to force the gauge wheel against the pipe so that it will follow the contour of the pipe as the head rotates with the ring, a welding torch having a tip mounted on the head for movement in an imaginary plane which lies through the axis of the pipe and the wheel pipe engaging location, power energized means on the head for adjusting the tip radially and axially of the pipe axis in the imaginary plane, and power energized means on the head for tilting the tip about a tilt axis extending generally parallel to the pipe axis and passing approximately through the engagement of the wheel with the pipe, including a follower arm pivotally mounted to the axial moving means, a reversible motor mounted to the axial moving means, a crank mounted to the drive shaft of the motor, and a drive arm mounted to the follower arm and crank, the tip being tilted back and forth about the tilt axis by activation of the reversible motor.

21. Pipe welding apparatus, comprising:

a frame having means for fixedly clamping it concentrically about the pipe, a ring mounted on the frame for rotation coaxially about the pipe, means for moving the ring about the pipe, a welding head mounted on the ring for movement therewith about the pipe, a gauge wheel, means mounting the gauge wheel on the head, means on the head for yieldably urging the gauge wheel mounting means inwardly to force the gauge wheel against the pipe so that it will follow the contour of the pipe as the head rotates with the ring, a welding torch having a tip mounted on the head for movement in an imaginary plane which lies through the axis of the pipe and the wheel pipe engaging location, and power energized means on the head for adjusting the tip radially and axially of the pipe axis in the imaginary plane, and power energized means on the head for tilting the tip about a tilt axis extending generally parallel to the pipe axis and passing approximately through the engagement of the wheel with the pipe, and mechanical means on the head for adjusting the position of the tip along the pipe axis to the welding area, including a support frame mounted to the tilting means, a guide rod mounted on the support frame extending axially along the pipe axis, a body slidably mounted on the rod, a drive screw threadably mounted in the body extending substantially parallel to the rod for moving the tip along the pipe axis.

22. Pipe welding apparatus, comprising:

a frame having means for fixedly clamping it concentrically about the pipe, a ring mounted on the frame for rotation coaxially about the pipe, means for moving the ring about the pipe, a welding head mounted on the ring for movement therwith about the pipe, a gauge wheel, means mounting the gauge wheel on the head, means on the head for yieldably urging the gauge wheel mounting means inwardly to force the gauge wheel against the pipe so that it will follow the contour of the pipe as the head rotates with the ring, a welding torch having a tip mounted on the head for movement in an imaginary plane which lies through the axis of the pipe and the wheel pipe engaging location, power energized means on the head for adjusting the tip radially and axially of the pipe axis in the imaginary plane, power energized means on the head for tilting the tip about a tilt axis extending generally parallel to the pipe axis and passing approximately through the engagement of the wheel with the pipe, mechanical means on the head for adjusting the position of the tip along the pipe axis to the welding area, and power energized means on the head for oscillating the tip back and forth along the pipe axis, including an arm supporting a torch mount and a motor mounted on the mechanical adjusting means for moving the arm back and forth and thereby oscillating the tip along the pipe axis.

23. Apparatus of the character defined in claim 22, wherein the torch mount includes a body pivotally mounted to the oscillating means arm for tilting the tip of the torch at an angle within the imaginary plane.

24. Apparatus of the character defined in claim 22, including:

a pendant capable of being used and carried by a single operator and means mounted on the pendant for controlling the ring moving means, the tip radial moving means, the tip axial moving means, the tip tilting means, and the tip oscillating rate and dwell time, the tip being positioned within the weld area by manipulation of the control means by the operator observing the weld area.

25. Apparatus of the character defined in claim 24, including:

a wire reel mounted on the ring for providing wire to the torch, means mounted on the ring for feeding the wire to the torch, and means mounted on the pendant for controlling the feed rate of the wire by the operator.

* * * * *